July 24, 1962 C. H. BECKER Re. 25,204

METHOD OF GEOPHYSICAL EXPLORATION

Original Filed March 9, 1956 3 Sheets-Sheet 1

CARL H. BECKER,
INVENTOR.
BY Harlow White
ATTORNEY.

METHOD OF GEOPHYSICAL EXPLORATION

Original Filed March 9, 1956 3 Sheets-Sheet 2

CARL H. BECKER,
INVENTOR.

BY H. Clarence White

ATTORNEY.

METHOD OF GEOPHYSICAL EXPLORATION

Original Filed March 9, 1956 3 Sheets-Sheet 3

CARL H. BECKER,
INVENTOR.

BY

ATTORNEY.

United States Patent Office

Re. 25,204
Reissued July 24, 1962

25,204

METHOD OF GEOPHYSICAL EXPLORATION

Carl H. Becker, Chevy Chase, Md., assignor to Western Geophysical Company of America, Los Angeles, Calif.

Original No. 2,925,138, dated Feb. 16, 1960, Ser. No. 570,554, Mar. 9, 1956. Application for reissue May 1, 1961, Ser. No. 107,290
32 Claims. (Cl. 181—.5)

Matter enclosed in heavy brackets [ ] appears in the original patent but forms no part of this reissue specification; matter printed in italics indicates the additions made by reissue.

This invention relates generally to geophysical exploration by the methods of seismic surveying, and more particularly has to do with novel methods and apparatus for visual presentation of signals or data having seismic origin and from which the disposition of subterranean formations may be rapidly determined. The invention broadly contemplates two-dimensional picturing of seismic waves incident upon detection instruments spread over the ground in a two-dimensional array, different wave pictures corresponding to different strata or earth formations about which geologic information may be deduced from the geometry and other aspects of the "pictures."

Past methods of seismic surveying have been limited in practice to the use of, at most, two differently oriented linear arrays of spaced detectors for generating signals in response to the detection of seismic disturbances along two directions only, one reason for limiting detector arrangements to one or two straight or curved lines or rows being the increasing difficulty of interpreting information received from detectors arrayed otherwise. But for the difficulty of data interpretation, however, it seems desirable to obtain information from a large number of detectors spread over an area instead of in lines, in order to increase the probability of discriminating between wanted seismic reflections and so-called "noise" picked up by the detectors.

The present invention is primarily directed to a novel method of seismic surveying in which data received from a large number of detectors is presented in such form that the data may be readily interpreted, the invention making possible and practical the spacing of a large number of detectors over a substantial area of the ground for improved seismic surveying. Accordingly, in one of its aspects the invention contemplates ground spacing a large number of seismic disturbance detectors in a two-dimensional array or pattern, such as a rectangular array or a polar array, as will be described, the spreading of the detectors making possible detection of reflected seismic disturbances over a large area. The latter result from the production of a seismic disturbance or disturbances at a point or points in the vicinity of the detector spread, the disturbance being propagated in all directions for reflection from various subterranean formations in the form of reflected seismic waves. Detection or discernment of the reflected waves occurs upon arrival of the waves at the detectors, the detection typically consisting in movement of a part of the detector is response to wave arrival, such movement bringing about the generation of an electrical signal varying in accordance with the detected waves.

As will be described more fully, a wave front of a particular reflected seismic wave has a more or less spherical curvature during its propagation through the earth, so that in general it arrives at different detectors at different times. At a particular instant of time, certain detectors will be detecting wave front arrival while others will not yet have detected the wave, and normally the responding detectors will be found to lie along a portion of a large ring, as can be imagined by picturing the locus of intersection of a plane with a spherical shell, the plane representing the surface of the earth and the shell representing the reflected seismic wave. As time progresses, wave front arrival will have traversed all the detectors, and it is a major purpose of the invention to show pictorially or graphically how the seismic waves arrive at the detectors by picturing the "rings" or portions thereof corresponding to the arrival of different waves and different aspects of each wave at the detectors.

For purposes of further explanation, wave arrival at the detectors is described in the art in terms of move-out which may be defined as the reciprocal of the phase velocity of the incident seismic wave between successive detectors, or mathematically as the quotient of the time elapsing between wave arrival at two detectors and the distance between the two detectors. In general, seismic waves reflected from different formations arrive at the detectors with different phase velocities, and the present method further contemplates selecting only certain of the arriving reflected waves for pictorial presentation, the process of wave choosing being based upon phase velocity discrimination as between different arriving waves.

Insofar as visual presentation of the reflected waves is concerned, the invention broadly proposes utilization of the signals generated by the detectors in response to reflected wave detection for affecting a two-dimensional display in such manner that its appearance is altered in accordance with wave detection. The display itself may comprise the screen of a cathode ray or television-type tube or even a motion picture screen, with various portions or zones of the screen having relative arrangement corresponding to the various detectors so that the zones visually portray the progress of wave detection at the particular detectors. For example, the intensity of light or color associated with the various zones of the screen may be made to change in response to changes in the intensity of the electrical signals generated by the detectors, and the screen zones may be spaced sufficiently close together to appear substantially continuous and uninterrupted for light blending purposes. Accordingly, wave detection may be presented pictorally in the form of continuous light and dark or differently colored areas on the screen.

In order that pictorally presented progress of wave detection may be in effect slowed or stopped completely, the invention contemplates multi-channel recording of the electrical signals received from all the detectors for later signal reproduction, the use of photographic, magnetic, phonographic, radio-magnetic or other suitable recording methods being contemplated. A method and apparatus for continuous radio-magnetic multi-channel recording of data on ferro magnetic or ferrite tape is described in my pending application entitled "Magnetic Recording" having Serial No. 514,978.

Discrimination between the original detector signals or between the signals reproduced from the recordings of the detector signals, for selective viewing of only certain of the signals corresponding to detected seismic waves reflected from one or more formations whose characteristics are to be analyzed, may be accomplished by a process of "stroboscopic" or interrupted presentation of only certain chosen signals on the screen. For this purpose a recording may be made of all signal information from all the detectors, corresponding to detection of all the reflected waves produced during one particular seismic "shot," and the recording may be conveniently repeatedly "read" to produce repeated signal patterns capable of being processed to remove or attenuate unwanted signals, leaving the repeated, wanted signals corresponding to the detected seismic waves reflected from those formations to be pictorially analyzed. The repeated, wanted signals may then be framed or projected on the two-dimensional viewing screen at a repetition rate sufficient to establish an apparently continuous picture.

Highly effective discrimination between wanted or unwanted signals may be achieved by subjecting the reproduced signals to electronic framing and storage in a two-dimensional pattern, as for example on the screen of a read-in, read-out electronic tube, the screen stored intensity pattern being read-out as by scanning methods after controllable storage time intervals related to the frequencies and/or phase velocities of those certain detected seismic waves to be subjected to visual analysis. The read-out signals are then framed or "projected" in the viewing screen for interpretation. Methods of signal processing to remove or attenuate unwanted signals, as by framing and storage of the signals for controllable time intervals may be broadly described in terms of signal filtering.

These and other objects of the invention, as well as the details of an illustrative embodiment, will be more fully understood from the following detailed description of the drawings, in which.

Figure 1:
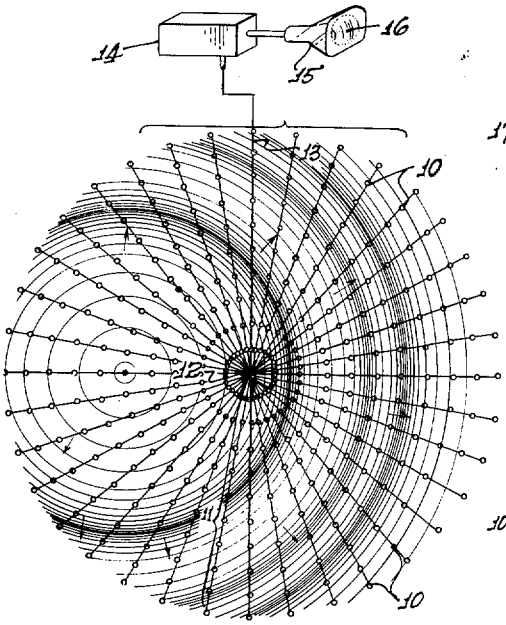
FIG. 1 is a plan view of a detector array in polar form, together with associated equipment for representing reflected seismic waves in pictorial form.

In FIG. 1 of the drawings, the individual detectors 10 are shown arrayed in two-dimensional polar form, that is with the detectors aligned in angularly separated, radially extending groups 11 passing through a selected center 12. Each group 11 conveniently, though not necessarily, contains 10 detectors, there being 36 such groups making 360 detectors in all. For purposes of ease in spreading the detectors in the field, the 10 detectors in each group may be connected to a cable at substantially equal intervals, and wires or cables from detectors in each group may extend radially toward a point in the vicinity of the center 12, from which point a single cable 13 conveniently conducts the wires to an appropriate circuit and/or storage unit schematically shown at 14. A suitable cathode ray type tube 15 is connected with the output of the circuit 14 to show on the screen 16 the progress of seismic wave arrival at the detectors.

The diameter of the array may be varied within a rather wide range, and proper choice of size of the array will depend on the geologic section and the objectives of the exploration program. Criteria for the determination of preferred dimensions of conventional arrays of detectors are well known to those skilled in the art and the same criteria may validly be applied to the dimensions of areal or two-dimensional arrays.

Figure 2:
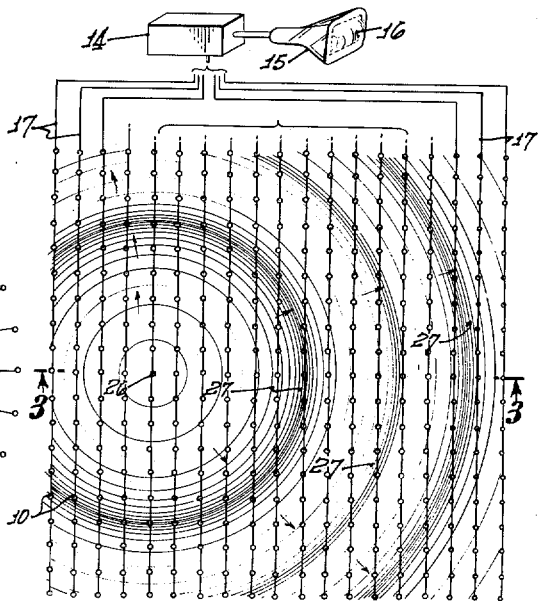
FIG. 2 is a view similar to FIG. 1, showing a rectangular detector array.

Referring now to FIG. 2, a rectangular array of detectors is shown, including 19 groups of 19 detectors in each group, the latter extending vertically in the drawing and being laterally separated at distances approximately equal to detector spacing in each group. Cables 17 corresponding to the individual groups of detectors are each made up of individual lines from individual detectors in the group and each line is separately connected into the circuit schematically shown at 14. Thus, each detector is connected by an individual wire to the unit 14. The apparatus 14 is more particularly shown in FIG. 6 and represents that portion of the circuit comprised by the portion of FIG. 6 between the detector group 40 and the observation tube 67, the latter being that tube shown at 15 in FIGS. 1 and 2. The detectors in FIG. 2 are spaced apart sufficiently so that the overall length and width of the array is substantially equal to the preferred dimensions of conventional arrays suitable to the region being surveyed as hereinabove described. Since there are 19 detectors in each group and 19 groups shown in FIG. 2, the array covers an approximately square ground area.

While the number of detectors in each group and the number of groups of detectors may be varied, it is contemplated that for adequate seismic coverage and conformance with readily available electronic circuit elements 19 groups of 19 detectors in a group are convenient, the total number of detectors then being 361. The polar arrangement shown in FIG. 1 is shown with 36 radial groups of 10 detectors, the total number of detectors being 360 which is in like manner convenient.

Figure 3:
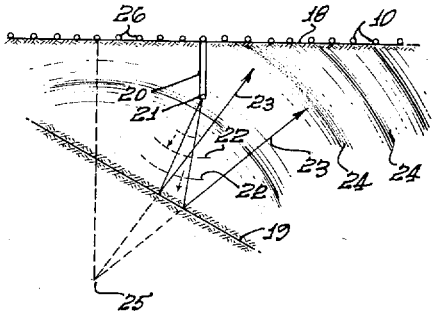
FIG. 3 is a vertical section through the substrata beneath the detector array of FIG. 2.

Referring now to FIG. 3 in relation to FIG. 2, a row or group of detectors 10 is shown extending along the surface 18 of the earth and above a subterranean formation such as lithologic interface 19, the location of which is not known but is to be determined in accordance with the methods of the present invention. A shot hole 20 extends approximately vertically downward into the earth from a point on the surface 18 located substantially in the center of the detector group, and at the bottom of the hole is placed a suitable explosive charge 21 for generating a seismic disturbance, other known methods for generating disturbances also being contemplated by the invention. Broken lines 22 in the drawing show a seismic disturbance being propagated in wave form through the earth from charge 21 toward the interface 19. Upon its incidence on the interface 19, each seismic disturbance is reflected back toward the surface of the earth, as indicated by the directional lines 23, and generally in a manner corresponding to the reflection of light from a mirror. In other words, the reflected seismic disturbances or waves 24 appear to originate from a point 25 at the side of the interface 19 opposite the explosion center 21 and at a distance from the interface equal to the distance between the latter and the explosion point.

The reflected seismic disturbances are generally propagated in wave form as alternating elastic compressions and expansions of the earth, indicated in the drawings by darker and lighter shading, the disturbances traveling away from the apparent explosion point 25 and in expanding approximately spherical form. As a result, when the reflected seismic waves or disturbances arrive at the surface of the earth, they would appear, if they could be seen, to travel radially outwardly and horizontally from a center 26 approximately vertically above the apparent explosion point 25. Furthermore, since the reflected seismic waves comprise alternating elastic compressions and expansions they would appear to travel radially outwardly from the center 26 in bands or rings as indicated by the shading at 27, the heavier shading for example corresponding to the localities of greatest elastic compression and the lightest shading indicating the greatest elastic expansions. FIGS. 2 and 3 indicate the positions of the traveling reflected seismic waves at one particular instant of time, and it is apparent that during a designated time interval the waves or bands shown in FIG. 2 will travel in two-dimensions and approximately radially away from the apparent center 26.

It will also be understood that the detectors 10 respond to seismic wave incidence thereon by generating electrical signals varying in accordance with the degree of compression and expansion of the earth on which they rest. For example, the detectors may be so constituted as to generate electrical signals having amplitudes varying in accordance with those of the incident seismic waves. As a result, assuming seismic wave arrival as indicated at 27 in FIG. 2, the detectors will be responding by generating electrical signals whose amplitudes are greater or lesser in accordance with the degree of elastic compression and expansion at the ground surface resulting from the arrival of the reflected seismic waves. Detectors responsive to vertical or horizontal displacement, velocity, acceleration or combinations thereof are well-known in the art, and it will be understood that such detectors are suitable for use in connection with the present invention, reference being made to a particular type of detector for purposes of illustration only.

Figure 12:
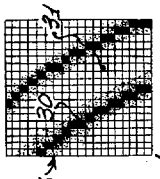
FIG. 12 is an illustration of a screen containing zones individually corresponding to the individual detectors in the array variable "brightness" of the zones indicating progress of seismic wave arrival at the detectors at one instant of time.

Referring now to FIG. 12 showing a portion of a display screen 16 having side by side zones 30 arranged in two-dimensional similarity with the detectors shown in FIG. 2, two dark bands 31 are indicated on the screen. These bands may be thought of as corresponding to bands 27 in FIG. 2, the degree of lightness and darkness associated with the bands on the screen generally corresponding to the degree of shading of the bands of FIG. 2. As a result, the screen 16 shows the progress of seismic wave arrival at the detectors in the array shown in FIG. 2. The curvature, co-ordinates, orientation, and motion of the bands supply sufficient information to determine depth, displacement, strike, dip and other information concerning substerranean formations.

Figure 4:
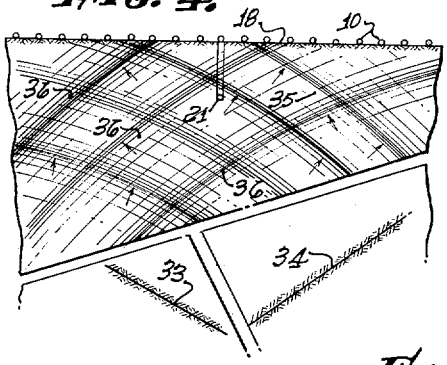
FIG. 4 is a view similar to FIG. 3 showing seismic waves reflected from two relatively deep angular formations.

In FIG. 4 two differently orientated substerranean interfaces or formations 33 and 34 are shown for the purpose of illustrating different seismic waves 35 and 36 respectively reflected from the formations. Simultaneous arrival of portions of the different reflected waves 35 and 36 with the surface 18 of the earth illustrates that discrimination between different sets of waves incident on the detectors presents a considerable problem; nevertheless, the present invention contemplates selection for visual study of one or more reflected seismic waves from the mass of such waves reflected by complex underground formations, all in the manner to be brought out.

Figure 5:
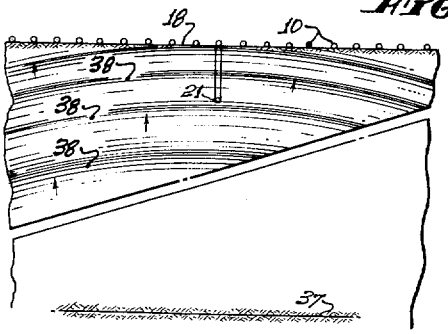
FIG. 5 is a view similar to FIG. 3 showing seismic waves reflected from a deep horizontal formation.

FIG. 5 shows a relatively deep subterranean formation 37 directly beneath the detector array, the depth of the formation being such that seismic waves 38 reflected therefrom arrive at the detectors with only slight spherical curvature. As a result, the detectors respond to wave arrival by simultaneously generating signals of almost equal amplitude, so that the viewing screen 16 would be alternately almost uniformly light and dark. To obviate the difficulties of interpreting the visual representation of such deep seismic waves, the invention further contemplates methods described in connection with FIG. 6 of processing or filtering the signals transmitted by the detectors so that only signals of selected amplitudes will be shown on the screen, giving greater visual demarcation between the arrival of successive, deeply originating seismic waves at the detectors.

Figure 6:
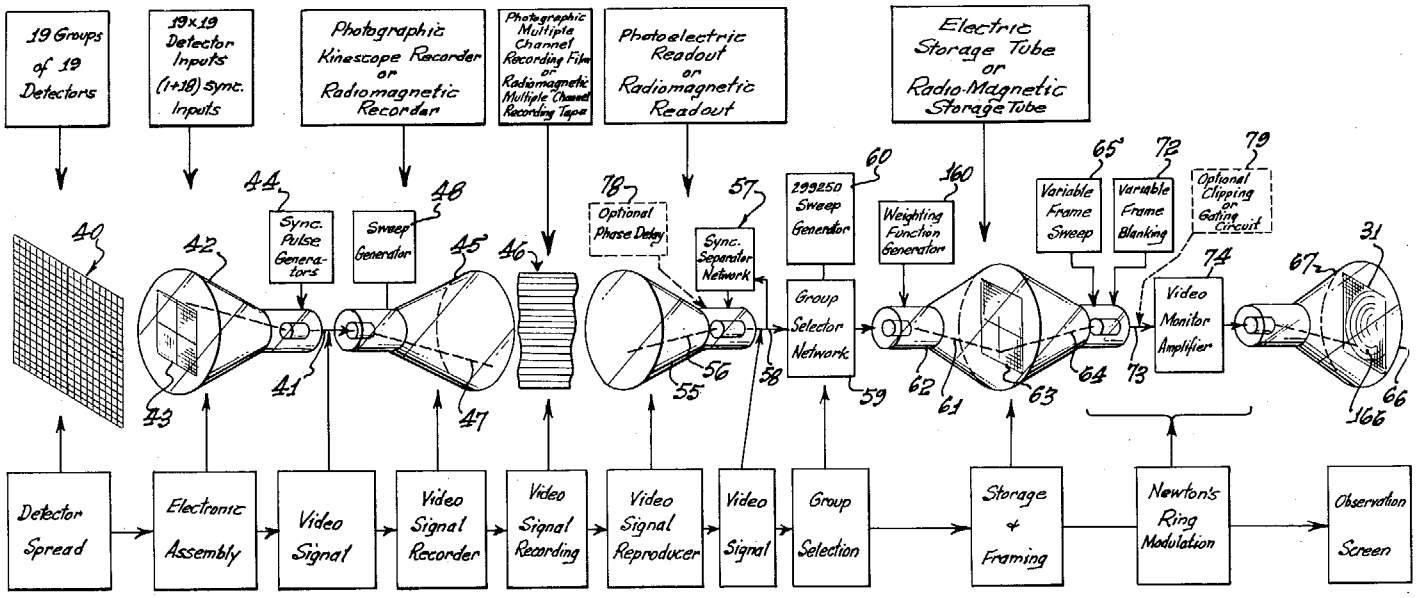
FIG. 6 is a schematic showing of the method and the equipment contemplated by the invention for transforming signals generated by the detectors into interpretable, pictorial form.

Coming now to a description of the actual apparatus to be utilized and the method to be followed for visually displaying the arrival of reflected seismic waves at a two-dimensional array of detectors, reference is made to FIG. 6, which is to be read from left to right in accordance with the order of signal processing. An array 40 of detectors is schematically shown in perspective at the extreme left of FIG. 6. Assuming that all of the detectors in the array are continuously generating signals varying in accordance with the amplitudes of the reflected seismic signals incident on the detectors, the simultaneously and continuously generated signals may be conveniently assembled, as by conventional electronic counter techniques, for purposes of modulating a separately generated ultra-high frequency carrier wave, and thereby producing a video signal indicated at 41. Apparatus of the type required for this purpose is well known in the field of telemetry and allied electronic arts. References to such apparatus include "Electronic Commutation for Telemetering," by L. L. Rauch, Electronics, vol. 20, February 1947, pp. 114–120; "Ultra Short Wave Multiplex," by C. R. Burrows, Proceedings of the Institute of Radio Engineers, vol. 33, 1945, pp. 84–94; "Radio Telemetry Symposium," Wright Patterson Air Force Base, Dayton, Ohio, September 27, 1955 (a short account of this symposium is found in I.R.E. Transactions on Telemetary and Remote Control, vol. TRC–2, No. 1, March 1956, pp. 5–20). The apparatus used for assembling the detector signals is schematically shown at 42, in which a "scannable" electrical representation 43 of the individual detector signals is rapidly and repeatedly "scanned" so as to assemble the signals for carrier wave modulating purposes as, for example, by scanning an array of glow lights corresponding to and modulated by the detectors with a conventional television image orthicon camera. In addition, suitable pulse generator circuits 44 provide the video signal with synchronizing pulses, hereinafter referred to as "sync" pulses, between signal "groups" and between signal "lines," one signal "group" representing a scan of signals from one group of detectors, and one signal "line" representing a scan of signals from all 19 groups of detectors.

Next, the video signal is recorded in succession on multi-channel film or tape either by photographic methods using a kinescope recorder, by conventional multi-channel magnetic tape, or by the radiomagnetic recording method described in my co-pending application referred to in the introduction. The recording means is schematically shown at 45 in the form of a tube across the front of which the multi-channel recording film or tape 46 is drawn to expose the latter to an intensity modulated light or cathode ray beam 47 repeatedly sweeping laterally across the moving film, a suitable sweep generator circuit 48 being provided for this purpose.

Figure 10:
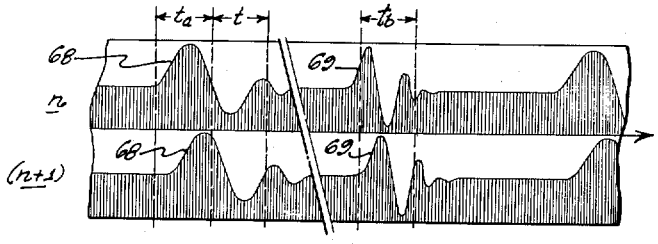
FIG. 10 is a view similar to FIG. 9, showing variable width records of signal generated by two detectors.
Figure 9:
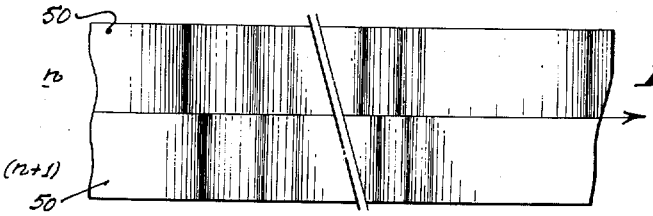
FIG. 9 is an enlargement of portions of two recording channels shown in FIG. 8 and illustrating variable density records of signals generated by two detectors.

Referring briefly to FIGS. 7 through 10, a preferred multi-channel recording film 46 is shown to comprise 19 parallel channel groups 49, each containing 19 separate channels 50 so that signals generated by all of the detectors may be simultaneously and separately recorded on 361 parallel channels 50. In addition, suitable group sync channels 51 are provided between successive 19 channel groups, and a line sync channel 52 is included at the side of the film. As mentioned above, signal information is, as shown in this example, photographically recorded on the film by means of a variable intensity light beam which is caused to sweep laterally across the film, for example from left to right as indicated by lines 53 in FIG. 7, while the film is drawn longitudinally in the direction of arrow 54. The sweep of the light beam across the film, of course, is synchronized with ie video signal to be recorded so that the signals generated by successive detectors in a detector group will e recorded on suitable channels 50 of the film. Furhermore, by this method of recording, one "scan" of he signals generated by all of the detectors is recorded luring one sweep of the light beam across the film, the vidth of the latter being sufficient for recordation of all of the generated signals with the desired range of inensity of each recorded signal. The time elapsing beween the beginnings of successive sweeps of beam 47 across the film constitutes one sweep time, and while the preferred sweep time is governed by the maximum frequency of seismic waves to be studied, a sweep time of one millisecond will be found convenient for most applications. Two photographic methods of signal recordation are shown in FIGS. 9 and 10, the former illustrating the variable density method indicated by the degree of shading extending across each channel, and the latter showing variable width recording.

Referring back to FIG. 6, the succeeding signal processing step comprises reproducing the video signal from the recording 46, and when the recording comprises a photographic film, a photoelectric read-out tube 55 may be utilized, a suitable optical system being provided to project continuously images of the film onto the screen of tube 55, so that the moving beam 56 may read-out the luminous intensities of the images present on the screen, according to known methods. Alternatively, if the recording 46 is made on tape by the radiomagnetic recording methods described in my co-pending application referred to above, a radiomagnetic read-out tube is utilized. As brought out above, the recording 46 essentially constitutes a continuous record of all of the detector signals generated during one seismic "shot," normally lasting several seconds. In order that the film may be repeatedly read by beam 56 for purposes of stroboscopic analysis of the visual bands on the viewing screen, opposite ends of the recording film or tape may be joined to form an endless loop, such a loop when continuously drawn past read-out tube 55 enabling repeated read-out by beam 56 of the recorded information on the film or tape.

The sync separator network 57 is provided to control sweep synchronism of the read-out beam 56 in accordance with the sync channels 51 and 52 on the recording 46, so that the resulting video signal is again organized to contain signal "groups" separated by sync pulses, as described above.

The video signal produced at 58 is then desirably subjected to a filtering stage for signal selection purposes, by passage to a group selector network 59 which, in combination with the weep generator 60, is adapted to synchronize the sweep of cathode beam 61 in a signal storage tube 62 with the groups of video signals separated by the group sync pulses. In addition, network 59 controls two-dimensional framing of the transmitted video signal onto the storage screen 63 of tube 62, in accordance with the group and line sync pulses in the video signal.

Storage tube 62 is utilized to accomplish signal filtering and thereby signal selection by electrically storing or charging the signals with a controlled amplitude function on the two-dimensional electrically chargeable framework of screen 63 for controllable time intervals, and also to read-out the charges on screen 63 at the ends of the storage time intervals, as by means of the read-out beam 64. The tube itself may comprise either an electric storage tube of known type or a radiomagnetic storage tube, the latter being described in my designated co-pending application. For optimum filtering, the intensity of the signals charged on screen 63 may be modified in accordance with a suitable so-called "weighting function" generated at 160 and controlling the intensity of the signal transmitting beam 61. The weight function may be chosen so that desired signal filtering characteristics are produced, the relationship between filter characteristics and weight functions being known in the art and described for example by Swartz and Sokoloff in "Filtering Associated With Selective Sampling of Geophysical Data," published in "Geophysics," vol. XIX, No. 3, pp. 402–419, for July 1954.

The time intervals during which signals are stored on the screen 63 may be effectively controlled by the read-out beam 64 which scans the screen and discharges the charged zones thereon at the ends of the selected time intervals, a variable sweep circuit 65 controlling beam 64 being provided for this purpose. Such controlled storage or framing of the signals on screen 63 is desirable for signal selection purposes and also to obtain maximum luminous intensity contrast on the screen 66 of the observation tube 67.

Figure 11:
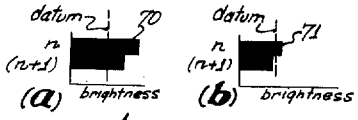
FIG. 11 illustrates comparative brightness or intensity patterns corresponding to the waves recorded on the two channels shown in FIG. 10, for two successive equal time intervals, as shown at (a) and (b)

Signal selection by means of controlled storage and forming of the signals in tube 62 may be better understood by a discussion of the signal traces formed on adjacent channels "n" and "n+1" of the portion of film shown in FIG. 10. Assuming that the signal trace events 68 on channels "n" and "n+1" correspond to a seismic wave reflected from a first underground formation, and that signal trace events 69 likewise correspond to a seismic wave reflection from another formation, and assuming further that the characteristic periods of events 68 and 69 are substantially different, it may be desirable for signal selection purposes to attenuate in tube 62 the signal reproduced from event 69 in order that only the signal derived from event 68 may be observed on the screen 66 of the observation tube 67. Accordingly a storage time interval corresponding to a length "t" of the film is selected corresponding to approximately one half the period of signal trace 68, so that all of the video signals received by tube 62 are framed and stored or integrated for successive equal time intervals "t," after each of which the integrated or stored signals on screen 63 are read-out by beam 64. As shown in FIG. 11(a), the strength or brightness 70 of the read-out integrated signal event 68 on channel "n" is considerably greater than the strength 71 of the later read-out integrated signal event 69 on the same channel shown in FIG. 11 (b), so that the brightness on screen 66 will be substantially increased only when seismic signals reflected from the selected formation and corresponding to signal trace 68 are being processed. In effect, some of the remaining recorded signals will be attenuated as a result of controlled time interval storage permitted by storage tube 62.

While the storage intervals "t" are shown in FIG. 10 as disjunct or separate, it is contemplated that the spacing between the beginnings of successive storage time intervals may be made substantially less than "t," as by first storing the signals on screen 63 for interval "t," reading out the stored signals, and then running the looped recording 46 all the way around upon itself before again commencing signal storage when the same "t" interval on the recording is physically offset only by a fraction of its length from its original position at which storage was begun. The effect produced on screen 63 will then be slow stroboscopic displacement of the bands 166.

Another type of signal filtering or discrimination as between selected signals and unwanted signals may be achieved through the use of a variable frame blanking circuit 72, which operates to pass to the observation tube only certain selected signals framed by tube 62 as for example those which correspond to the signal events 68 in FIG. 10, the remaining signals being completely cut off from passage to the observation tube.

Finally, the processed video signal at 73 is led through appropriate monitor and amplifier circuits located at 74, and then to the observation tube 67 for projection on screen 66.

In addition to signal selection, it is often desirable that one portion of the selected signal be repeatedly passed to the observation tube 67 in order that the band 31 on the screen may appear stationary. For this purpose, the looped recording 46 is drawn past read-out tube 55 at a sufficiently rapid rate that repeated video signal patterns may be transmitted to the observation tube giving a continuous, stationary band picture. It is also possible to bypass the signal storage and framing step completely and lead the video signal directly from the group selector network 59 through the video monitor and amplification circuits at 74 to the observation tube 67. Accordingly the speed of traverse of the recording 46 past the read-out tube 55 may be adjusted in relation to controllably interrupted scanning thereof by beam 56 to transmit signals to the observation tube at a rate sufficient for viewing on the screen 66, the interrupted scanning in tube 55 providing suitable "stroboscopic" effect for viewing only certain bands on the screen. The rate of scanning may also be adjusted relative to the speed of traverse of the recording in such a manner as to afford a "slow motion" picture on the viewing screen of the reflection bands.

Figure 14:
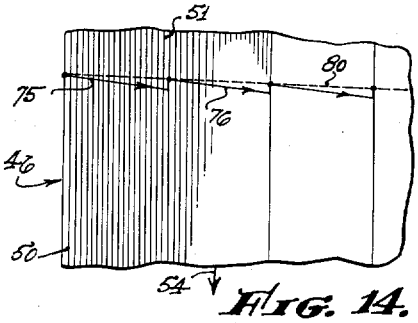
FIG. 14 is a view similar to FIG. 8 showing a method of scanning the recording so as to have the effect of varying the apparent subterranean location and attitude of a formation from which seismic waves are reflected and received by the detectors.

FIG. 14 shows a method of saw-tooth scanning of the recording 46 as by beam 56 for introducing time phase delay in the reproduced video signal of such character that the bands 31 on the observation tube will appear to indicate that an underground formation exists at a certain locality, when in actual fact the formation exists at another underground position. In other words, by introducing controlled phase delay scanning of the recording 46, an underground formation such as that shown at 33 in FIG. 4 may be apparently shifted in space for more convenient interpretation on the screen 66. The optional phase delay circuit is schematically indicated at 78 in FIG. 6. As shown in the illustrative example in FIG. 14, beam scanning progresses laterally across the channels 50, but in the angular direction designated at 75, going forward in time. Upon arriving at sync channel 51, the beam is displaced backwardly in a time-wise sense to a point on broken line 80 which progresses forwardly while traversing the recording from left to right. The beam then scans the next group of channels along line 76, this saw-tooth pattern being repeated. It is to be understood that both line directions 75 and 80 are controllable and either or both may progress backwardly or forwardly in a time-wise sense, in order that all possible directions and magnitudes of apparent displacement of the reflection bands may be achieved. In other words, the invention contemplates adjustable scanning of the recording to achieve desired arrangements of the bands 31 on the observation screen 66, enabling clearer interpretation thereof.

Figure 13:
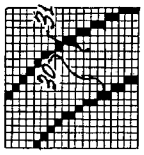
FIG. 13 is a view similar to FIG. 12 illustrating the appearance of the screen after appropriate rejection of signals that would otherwise produce only intermediate brightness on the screen.
Figure 7:
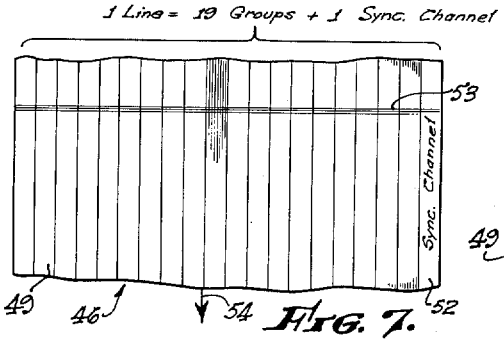
FIG. 7 is a plan view of a fragmentary section of multichannel recording tape or film.
Figure 8:
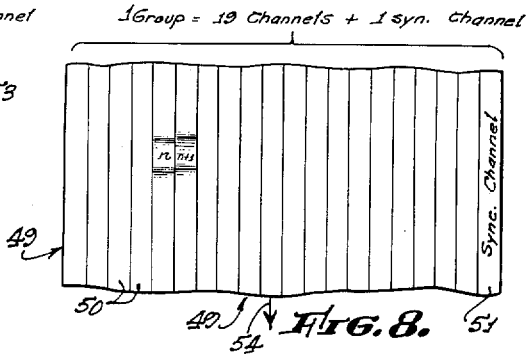
FIG. 8 is an enlargement of a portion of FIG. 7 containing records of the signals generated by the detectors of one group.

FIG. 13 indicates dark bands 31 on screen 66 which appear in high contrast to the adjacent clear zones 30, as compared with the varied degrees of shading shown in FIG. 12. The clarifying effect on the bands may be suitably accomplished by passing the video signal at 73 through appropriate signal clipping or gating stages 79, whereby only those selected signals having amplitudes greater than a desired minimum are passed to the observation tube, or whereby a signal is passed only when its amplitude or rate of change has a predetermined value.

Figure 15:
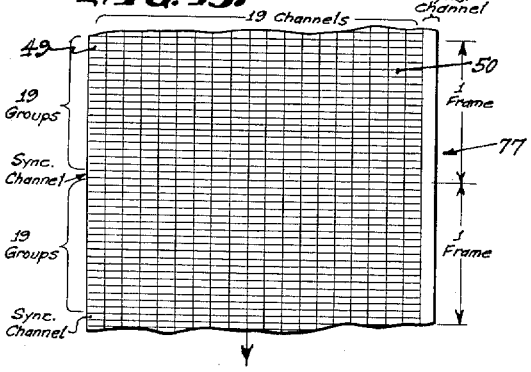
FIG. 15 is an illustration of an alternate method of recording the signals received from the detectors.

Another type of recording is shown at 77 in FIG. 15 wherein the channels 50 of one group are spread across the width of the recording, and successive groups 49 are spaced longitudinally along the recording. This method corresponds to more conventional television type recording systems.

Still another suitable type of recording is the conventional multi-channel magnetic type recording using a number of individual recording heads equal to the number of channels of information to be recorded. Scanning may be performed in this system by means of an electronic switch.

I claim:

1. The method of seismic surveying that includes ground spacing a plurality of seismic wave detectors in a substantially two-dimensional array, producing a seismic wave which is thereafter reflected from subterranean formations in the form of reflected seismic waves traveling toward said detectors, detecting said seismic waves, generating a first set of signals at the detectors in response to said detection, recording said signals, producing a second set of signals from said recorded signals, processing said second set of signals to select certain signals corresponding to a detected seismic wave reflected from one of said formations, and utilizing said certain signals to control light transmission from different zones of a substantially two-dimensional plan-view display corresponding to said detector array whereby the display visibly reproduces the detection by said detectors of said seismic wave, said utilization being carried out so that the certain signal derived from any one selected detector controls light transmission from one and only one zone of the display, said zone being located in a position homologous within the display to the location of the said selected detector within the array.

2. The method of claim 1 comprising displaying said certain signals on the screen of a cathode ray tube.

3. The method of claim 1 in which said processing step includes filtering said second set of signals.

4. The method of claim 1 in which said processing step includes varying the amplitudes of said second set of signals in accordance with a selected weight function, and integrating each of the signals in said second set over selected successive time intervals.

5. The method of claim 4 in which said processing step includes electrical storage of said second set of signals.

6. The method of claim 4 in which said processing step includes magnetic storage of said second set of signals.

7. The method of claim 4 including controlling said time intervals to select different electrical signals corresponding to detected seismic waves reflected from different formations.

8. The method of claim 1 comprising scanning said recorded signals to produce said second set of electrical signals.

9. The method of claim 8 comprising controlling the direction of said scanning relative to the orientation of said recorded signals on the recording so as to vary the time phase relationship of said second set of signals, whereby the apparent space phase relationship of said detected seismic wave may be controlled.

10. The method of seismic surveying that includes ground spacing a plurality of seismic disturbance detectors in a substantially two-dimensional plan-view array, producing a seismic disturbance which is thereafter detected by said detectors, generating signals at said detectors in response to said detection, forming a substantially two-dimensional plan-view display corresponding to said detector array and utilizing the signal derived from any one selected detector to modulate one and only one areal portion of the display, whereby the display visibly reproduces the detection by said detectors of said disturbance.

11. The method of seismic surveying that includes ground spacing a plurality of seismic disturbance detectors in a substantially two-dimensional plan-view array, producing a seismic disturbance which is thereafter detected by said detectors, generating signals at said detectors in response to said detection, forming a substantially two-dimensional display homologous to said detector array and utilizing the signal derived from any one selected detector to modultae one and only one areal portion of the display, whereby the display visibly reproduces the detection by said detectors of said disturbance.

12. The method of seismic surveying that includes ground spacing a plurality of seismic disturbance detectors in a substantially rectangular plan-view array, producing a seismic disturbance which is thereafter detected by said detectors, generating signals at said detectors in response to said detection, forming a substantially two-dimensional plan-view display corresponding to said detector array and utilizing the signal derived from any one selected detector to modulate one and only one areal portion of the display, whereby the display visibly reproduces the detection by said detectors of said disturbance.

13. The method of seismic surveying that includes ground spacing a plurality of seismic disturbance detectors in a substantially polar plan-view array, producing a seismic disturbance which is thereafter detected by said detectors, generating signals at said detectors in response to said detection, forming a substantially two-dimensional plan-view display corresponding to said detector array and utilizing the signal derived from any one selected detector to modulate one and only one areal portion of the display whereby the display visibly reproduces the detection by said detectors of said disturbance.

14. The method of seismic surveying that includes ground spacing a plurality of seismic disturbance detectors in a substantially two-dimensional plan-view array, producing a seismic disturbance which is thereafter detected by said detectors, generating signals at the detectors in response to said detection, recording said signals, reproducing said signals from the recording, forming a substantially two-dimensional plan-view display corresponding to said detector array and utilizing the signal derived from any one selected detector to modulate one and only one areal portion of the display, whereby the display visibly reproduces the detection by said detectors of said disturbance.

15. The method of seismic surveying that includes ground spacing a plurality of seismic disturbance detectors in a substantially two-dimensional plan-view array, producing a seismic disturbance which is thereafter reflected from subterranean formations in the form of reflected seismic disturbances traveling toward said detectors, detecting said reflected disturbances at the detectors, generating signals at the detectors in response to said detection, recording said signals, reproducing said signals from the recording, processing said reproduced signals to derive selected signals corresponding to particular detected disturbances reflected from certain of said formations, forming a substantially two-dimensional plan-view display corresponding to said detector array and utilizing the signal derived from any one selected detector to modulate one and only one areal portion of the display, whereby the display visibly reproduces the detection by said detectors of said particular disturbances.

16. The method as defined in claim 15 in which said processing step includes signal filtering.

17. The method as defined in claim 15 in which said recording step includes photographic signal recording.

18. The method as defined in claim 15 in which said recording step includes magnetic signal recording.

19. The method as defined in claim 15 comprising utilizing said selected signals to affect repeatedly the appearance of said display.

20. The method as defined in claim 19 comprising repeatedly displaying said selected signals on the screen of a cathode ray tube.

*21. The method of seismic signal observation that includes ground spacing a plurality of seismic wave detectors in a substantially two-dimensional array, detecting with said detectors seismic waves which have been reflected from subterranean formations, generating a first set of signals at the detectors in response to said detection, recording said signals, producing a second set of signals from said recorded signals, processing said second set of signals to select certain signals corresponding to a detected seismic wave reflected from one of said formations, and utilizing said certain signals to control light transmission from different zones of a substantially two-dimensional plan-view display corresponding to said detector array whereby the display visibly reproduces the detection by said detectors of said seismic wave, said utilization being carried out so that the certain signal derived from any one selected detector controls light transmission from one and only one zone of the display, said zone being located in a position homologous within the display to the location of the said selected detector within the array.*

*22. The method of seismic signal observation that includes ground spacing a plurality of seismic disturbance detectors in a substantially two-dimensional plan-view array, detecting a seismic disturbance with said detectors, generating signals at said detectors in response to said detection, forming a substantially two-dimensional plan-view display corresponding to said detector array and utilizing the signal derived from any one selected detector to modulate one and only one areal portion of the display, whereby the display visibly reproduces the detection by said detectors of said disturbance.*

*23. The method of seismic signal observation that includes ground spacing a plurality of seismic disturbance detectors in a substantially two-dimensional plan-view array, detecting a seismic disturbance with said detectors, generating signals at said detectors in response to said detection, forming a substantially two-dimensional display homologous to said detector array and utilizing the signal derived from any one selected detector to modulate one and only one areal portion of the display, whereby the display visibly reproduces the detection of said detectors of said disturbance.*

*24. The method of seismic signal observation that includes around spacing a plurality of seismic disturbance detectors in a substantially rectangular plan-view array, detecting a seismic disturbance with said detectors, generating signals at said detectors in response to said detection, forming a substantially two-dimensional plan-view display corresponding to said detector array and utilizing the signal derived from any one selected detector to modulate one and only one areal portion of the display, whereby the display visibly reproduces the detection by said detectors of said disturbance.*

*25. The method of seismic signal observation that includes ground spacing a plurality of seismic disturbance detectors in a substantially polar plan-view array, detecting a seismic disturbance with said detectors, generating signals at said detectors in response to said detection, forming a substantially two-dimensional plan-view display corresponding to said detector array and utilizing the signal derived from any one selected detector to modulate one and only one areal portion of the display whereby the display visibly reproduces the detection by said detectors of said disturbance.*

*26. The method of seismic signal observation that includes ground spacing a plurality of seismic disturbance detectors in a substantially two-dimensional plan-view array, detecting a seismic disturbance with said detectors, generating signals at the detectors in response to said detection, recording said signals, reproducing said signals from the recording, forming a substantially two-dimensional plan-view display corresponding to said detector array and utilizing the signal derived from any one selected detector to modulate one and only one areal portion of the display whereby the display visibly reproduces the detection by said detectors of said disturbance.*

*27. The method of seismic signal observation that includes ground spacing a plurality of seismic disturbance detectors in a substantially two-dimensional plan-view array, detecting with said detectors, seismic waves which have been reflected from subterranean formations, generating signals at the detectors in response to said detection, recording said signals, reproducing said signals from the recording, processing said reproduced signals to derive selected signals corresponding to particular detected disturbances reflected from certain of said formations, form-*

*ing a substantially two-dimensional plan-view display corresponding to said detector array and utilizing the signal derived from any one selected detector to modulate one and only one areal portion of the display, whereby the display visibly reproduces the detection by said detectors of said particular disturbances.*

*28. The method as defined in claim 27 in which said processing step includes signal filtering.*

*29. The method as defined in claim 27 in which said recording step includes photographic signal recording.*

*30. The method as defined in claim 27 in which said recording step includes magnetic signal recording.*

*31. The method as defined in claim 27 comprising utilizing said selected signals to affect repeatedly the appearance of said display.*

*32. The method as defined in claim 31 comprising repeatedly displaying said selected signals on the screen of a cathode ray tube.*

References Cited in the file of this patent or the original patent

UNITED STATES PATENTS

| | | |
|---|---|---|
| 2,099,536 | Scherbatskoy et al. | Nov. 16, 1937 |
| 2,580,636 | Wolf | Jan. 1, 1952 |
| 2,620,890 | Lee et al. | Dec. 9, 1952 |
| 2,628,689 | Rieber | Feb. 17, 1953 |
| 2,693,862 | Rieber | Nov. 9, 1954 |
| 2,698,928 | Pulvari | Jan. 4, 1955 |
| 2,756,836 | Rieber | July 31, 1956 |
| 2,759,551 | Carlisle et al. | Aug. 21, 1956 |

OTHER REFERENCES

Rust: "What's New in Geophysics," World Oil Magazine, vol. 138, No. 5, pages 80–82 and 84, April 1954.

Beeman: "What About Reproducible Seismic Recording," World Oil Magazine, vol. 138, No. 5, pages 86, 88, April 1954.